United States Patent
Léonard

(10) Patent No.: US 10,378,937 B2
(45) Date of Patent: Aug. 13, 2019

(54) DYNAMIC CLUSTERING OF TRANSIENT SIGNALS

(75) Inventor: François Léonard, Montréal (CA)

(73) Assignee: HYDRO-QUÉBEC, Montréal, Quebec ( * ) Notice: Subject to any disclaimer, the term of this patent is extended or adjusted under 35 U.S.C. 154(b) by 420 days.

(21) Appl. No.: 14/118,292

(22) PCT Filed: May 25, 2012

(86) PCT No.: PCT/CA2012/050343
§ 371 (c)(1),
(2), (4) Date: Nov. 18, 2013

(87) PCT Pub. No.: WO2012/162825
PCT Pub. Date: Dec. 6, 2012

(65) Prior Publication Data
US 2014/0100821 A1    Apr. 10, 2014

(30) Foreign Application Priority Data

May 27, 2011    (CA) ...................................... 2741202

(51) Int. Cl.
*G01D 21/00* (2006.01)
*G06K 9/00* (2006.01)
(Continued)

(52) U.S. Cl.
CPC .............. *G01D 21/00* (2013.01); *G06F 17/18* (2013.01); *G06K 9/00536* (2013.01); *G06K 9/622* (2013.01); *G06K 9/6272* (2013.01)

(58) Field of Classification Search
CPC ..................................................... G01D 21/00
(Continued)

(56) References Cited

U.S. PATENT DOCUMENTS 5,479,570 A    12/1995    Imagawa et al.
6,088,658 A     7/2000    Yazici et al.
(Continued)

FOREIGN PATENT DOCUMENTS

JP    H07-6149 A      1/1995
JP    H11-14121 A     1/1999
JP    2010-92355 A    4/2010

OTHER PUBLICATIONS

M. de Nigris and Al., "Cable Diagnosis based on defect location and characterization through partial discharge measurements", CIGRE 2002, Paper 15-109, Paris, France, 2002.
(Continued)

*Primary Examiner* — Ricky Ngon
(74) *Attorney, Agent, or Firm* — Muirhead and Saturnelli, LLC

(57) ABSTRACT

A method for clustering of transient signals is provided. The method comprises the steps of acquiring the transient signals as they come, dynamically building up clusters of similar transient signals in a hyperspace based on comparison and clustering rules so that each new one of the transient signal acquired ends up in a cluster with similar transient signals formerly acquired, analyzing the clusters to determine respective signatures defined by the transient signals gathered in the clusters, and processing the signatures to detect a phenomenon connectable to an intrinsic attribute of the transient signals.

15 Claims, 4 Drawing Sheets

(51) Int. Cl.
*G06K 9/62* (2006.01)
*G06F 17/18* (2006.01)

(58) Field of Classification Search
USPC .......................................................... 702/189
See application file for complete search history.

(56) References Cited

U.S. PATENT DOCUMENTS

| | | | |
|---|---|---|---|
| 6,868,365 | B2 | 3/2005 | Balan et al. |
| 7,579,843 | B2 | 8/2009 | Younsi et al. |
| 8,358,857 | B2 | 1/2013 | Demirci et al. |
| 9,104,747 | B2 | 8/2015 | Raichelgauz et al. |
| 2008/0058668 | A1* | 3/2008 | Seyed Momen .. A61B 5/04888 600/546 |
| 2008/0088314 | A1 | 4/2008 | Younsi et al. |
| 2010/0128936 | A1* | 5/2010 | Baughman ......... G06K 9/00885 382/116 |
| 2010/0311482 | A1 | 12/2010 | Lange |
| 2011/0191076 | A1 | 8/2011 | Maeda et al. |
| 2012/0303619 | A1* | 11/2012 | Fisera .................... G06Q 50/06 707/737 |

OTHER PUBLICATIONS

Kraetge, K. Rethmeier, M. Krüger and P. Winter, "Synchronous Multi-Channel PD Measurements and the Benefits for PD Analyses", T&D, IEEE PES, New Orleans, USA, 2010.
Belkov, A. Obralic, W. Koltunowicz and R. Plath "Advanced approach for automatic PRPD pattern recognition in monitoring of HV assets", ISEI, San Diego, USA, Jun. 2010.
T. Zhiguo and Al., "Pulse interferences elimination and classification of on-line UHF PD signals for power transformers", IEEE CMD 2008, pp. 937-940, Beijing, China, Apr. 2008.
T. Babnik, R. K. Aggarwal and P. J. Moore, "Principal component and Hierarchical cluster analyses as applied to transformer partial discharge data with particular reference to transformer condition monitoring", IEEE Transaction on power delivery, vol. 23, No. 4, Oct. 2008.
Contin and S. Pastore, "An Algorithm, Based on Auto-Correlation Function Evaluation, for the Separation of Partial Discharge Signals", 2004 IEEE International Symposium on Electrical Insulation, Indianapolis, USA, Sep. 2004.
J. MacQueen, "Some Methods for Classification and Analysis of Multivariate Observations", Proc. Fifth Berkeley Symp. Math. Statistics and Probability, vol. 1, pp. 281-296, 1967.
Cerioli, F. Laurini and A. Corbellini, "Functional Cluster Analysis of Financial Time Series New Developments in Classification and Data Analysis", Studies in Classification, Data Analysis, and Knowledge Organization, Part III, 333-341, 2005.
A.M. Alonso, J.R. Berrendero, A. Hernández, A. Justel, "Time series clustering based on forecast densities", Computational Statistics & Data Analysis, vol. 51, p. 762-776, 2006.
Singhal and D.E. Seborg, "Clustering multivariate time-series data", Journal of chemometrics 2005; vol. 19, p. 427-438, 2005.
E. Shannon, "Communication in the presence of noise", Proc. IRE, vol. 37, No. 1, p. 10-21, Jan. 1949.
X.-S. Zheng, P.-L. He, F.-Y. Wan, Z. Wang, G.-Y. Wu, "Dynamic clustering analysis of documents based on cluster centroids", Proceedings of the Second International Conference on Machine Learning and Cybernetics, Xi, Nov. 2-5, 2003.
T. Kanungo, D. M. Mount, N. S. Netanyahu, C. D. Piatko, R. Silverman, A. Y. Wu, "An Efficient k-Means Clustering Algorithm: Analysis and Implementation", IEEE Transaction on pattern analysis and machine intelligence, vol. 24, No. 7, Jul. 2002.
Si Wenrong, et al., "Digital Detection, Grouping and Classification of Partial Discharge Signals at DC Voltage," IEEE Transactions on Dielectrics and Electrical Insulation vol. 15, No. 6; Dec. 2008.
Rethmeier K, et al: "Experiences in on-site partial discharge measurements and prospects for PD monitoring", Condition Monitoring and Diagnosis, 2008. CMD 2008. International Conference on, IEEE, Piscataway, NJ, USA, Apr. 21, 2008 (Apr. 21, 2008), pp. 1279-1283, XP031292425, ISBN: 978-1-4244-1621-9.
Agamalov O N: "The technique of clustering analysis of partial discharge", Power Systems Conference and Exposition, 2009. PES '09. IEEE/PES, IEEE, Piscataway, NJ, USA, Mar. 15, 2009 (Mar. 15, 2009), pp. 1-9, XP031450530, ISBN: 978-1-4244-3810-5.
Frank Reine et al: "Signal-Level Clustering for Data Analysis", International Symposium on Intelligent Data Analysis (IDA-95), vol. LNCS 3646, Sep. 8, 2005 (Sep. 8. 2005), pp. 1-5, XP055182512, Madrid, Spain.

* cited by examiner

DYNAMIC CLUSTERING OF TRANSIENT SIGNALS

FIELD OF THE INVENTION

The present invention relates to signal analysis methods, and more particularly to a system and a method for dynamic clustering of transient signals.

BACKGROUND

Transient signals are found in various areas such as radars, partial discharges, arcing noises (unsteady discharge in a plasma), stock price fluctuations, fluid cavitation, acoustic emission, telluric waves and imagery.

A recurring problem in many of these areas is that the distinct processing of each transient requires an exaggerated computation effort and targets a noisy signal.

U.S. Pat. No. 6,088,658 (Yazici et al.), U.S. Pat. No. 6,868,365 (Balan et al.), U.S. Pat. No. 7,579,843 (Younsi et al.) and US 2008/0088314 (Younsi et al.) provide examples of prior art systems and methods for analyzing signals, involving time consuming and resource intensive computation and computer-related tasks.

SUMMARY

An object of the invention is to provide a system and method of clustering transient signals, which regroup similar transients in a characteristic signature in order to process a reduced number of signatures for the groups, e.g. one signature per group. As there are less signatures, computation time is reduced. A signature being less noisy than its separated components, the processing result is all the more precise and the result is already classified.

According to one aspect of the present invention, there is provided a method for clustering of transient signals, comprising the steps of:
  acquiring the transient signals as they come;
  dynamically building up clusters of similar transient signals in a hyperspace based on comparison and clustering rules so that each new one of the transient signal acquired ends up in a cluster with similar transient signals formerly acquired;
  analysing the clusters to determine respective signatures defined by the transient signals gathered in the clusters; and
  processing the signatures to detect a phenomenon connectable to an intrinsic attribute of the transient signals.

According to another aspect of the present invention, there is also provided a computer system having a processor and a memory storing executable instructions to be executed by the processor to perform the steps of the method.

According to another aspect of the invention, there is provided a non-transitory tangible computer readable storage medium storing executable instructions to be executed by a computer system for performing the steps of the method.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

In the present disclosure, the time or the space can be replaced by any other dimension of any other nature.

The present invention is directed to transient signals whose characteristics are to be repetitive for a portion of their population. By repetitive, it is to be understood that a same transient may be observed more than one time in the time or the space, with an amplitude that may vary and also with a low dissimilarity that may be explained by the noise, a measurement error, a time or spatial distortion of the transient carrier or any other modelizable phenomenon (digitally, analytically or statistically).

The present invention proposes to dynamically regroup the transients, i.e. as they are captured by the measurement system or acquired by an appropriate device. By regrouping, it is to be understood that similar transients are assembled into a same group, a given group thus containing at least one transient, and the result yielding at least one group having more than one transient associated therewith. A grouping that is non-dynamic means that a comparison is made with all the transients on hand; although closer to optimality, the computation time of this approach is exhaustive.

Presented in a space $\mathfrak{R}^N$, where N is a number of temporal or spatial dots characterizing a transient, a grouping appears such as a cloud of dots in this hyperspace. The center of mass of the grouping that corresponds to the means of the transients of the grouping will be called signature.

The transient to transient, transient to signature or signature to signature comparison requires a time or space shift in order to maximize the correlation or minimize the distance between both elements of the comparison. In the case of a distance based comparison criteria, at zero order, the shift is achieved in one block such that $$D_{m,i} = \min\left\{ \sqrt{\sum_{n=1}^{N} (X_{m,n-d} - S_{i,n})^2} \right\}_{d \in \{-\frac{T}{2}, \frac{T}{2}\}}$$

depicts the distance between the transient X and the signature S. It is possible to achieve a first order shift by interpolating the transient (or the signature) so as to stretch or compress it. It is the same for the second order. Furthermore, a dynamic time warping type of method may be considered as a shifting means for the distance computation. Basically, an appropriate shift between both elements of the comparison is to occur in the comparison.

Figure 1:
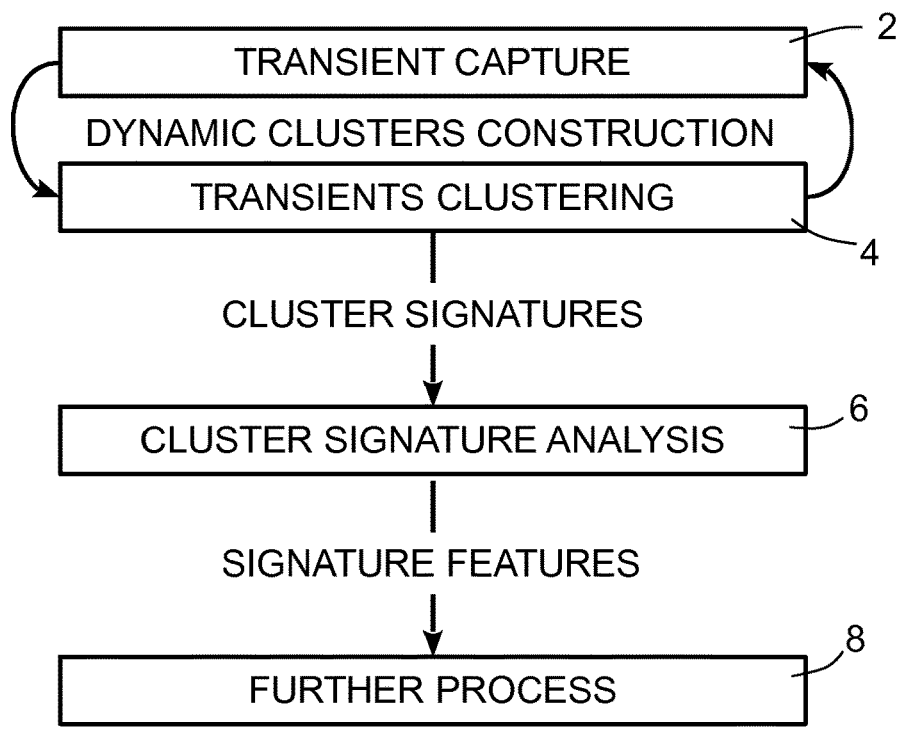
FIG. 1 is a flow chart illustrating the method according to the invention.

Referring to FIG. 1, the method according to the invention proceeds as follows. Transients are captured as depicted by block 2 and are subjected to a clustering as depicted by block 4 for dynamic cluster construction with cluster signatures. The signatures are analyzed as depicted by block 6 so as to determine signature features usable for further processing related to the nature of the transients under scrutiny as depicted by block 8. The method may be implemented in a computer system having a processor and a memory storing executable instructions to be executed by the processor to perform the above recited steps. The method may also take the form of a non-transitory tangible computer readable storage medium storing executable instructions to be executed by a computer system for performing the steps of the method.

The following provides an example of an embodiment of the invention in the context of partial discharge detection, location and analysis. It should be understood that the invention is not limited to such embodiment and application, and that changes and modifications can be made without departing from the invention.

The method according to the invention may be used for voltage transient classification by a dynamic time clustering. Inside an underground vault of an electrical distribution network, many hundred signal transients may be captured in a few seconds, many of which are partial discharges (PD). Signal processing and pattern recognition for each transient are time consuming. Grouping M transients into/clusters dramatically reduces the processing time and significantly increases the signal-to-noise ratio of the corresponding/ signatures. The clustering may be done over many hundred dimensions N, with each dimension corresponding to a signal time sample. Since the time position of a transient is corrupted by a time jitter, the distance function is calculated for T different time alignments. A heuristic similar to the k-means algorithm is explained based on the "sphere hardening" phenomenon and has a O(T×N×M×I) complexity for I clusters. Different tools are proposed for assessing the accuracy of the clustering process and optimizing some parameters of the method.

The signals to be processed according to the invention may be sampled e.g. at 1 Gs/s, filtered, interpolated and truncated. A few hundred time samples N describe the transient pattern. For a PD emission location "i", assuming a constant normalized time signature $s_i(t)$ over different amplitudes, there is obtained $$x_m(t) = a_m \cdot s_i(t-t_m) + n_m(t) \quad (1)$$

the realization of the measurement "m" of a transient signature, where $a_m$ is the realization amplitude, $t_m$ the realization delay and $n_m$ the additive noise. The corresponding modeling is $$x_{mn} = a_m \cdot s_{n-d_m} + n_{mn} \quad (2)$$

with discretization. The successive measurements taken over one analog input scale are called a sequence. The $a_m$ dynamic range may be less than 10 dB for a sequence, i.e. the ratio of the clipping level on the trigger setting level. The first clustering step may be performed for a fixed scale. The full dynamic range can then be obtained in a second step by merging the clusters obtained from different ND scales. In some cases, the $a_m$ dynamic range may exceed 30 dB.

Assuming a Gaussian noise and disregarding the $a_m$ dynamic, the $\Re^N$ projection shows a hypersphere centered on the "i" signature $$S_i = \{S_{i,1}, S_{i,2}, \ldots, S_{i,N}\} \quad (3)$$

where the measurements $$X_m = \{X_{m,1}, X_{m,2}, \ldots, X_{m,N}\} \quad (4)$$

are close to the hypersphere boundary. The boundary thickness is a function of the metric, the measurement signal-to-noise ratio (SNR) and the number of time samples N. For an Euclidian metric, the distance $$D_{m,i} = \min\left\{\sqrt{\sum_{n=1}^{N} (X_{m,n-d} - S_{i,n})^2}\right\}_{d \in \{-\frac{T}{2}, \frac{T}{2}\}} \quad (5)$$

has the expected mean $$r_1 = E(D_{m,i}) = \sqrt{NE(n_{mn}^2)} \quad (6)$$

for $x_m \in$ cluster "i" and the standard deviation $$\sigma_i = \sqrt{E(n_m^2)}. \quad (7)$$

Figure 2:
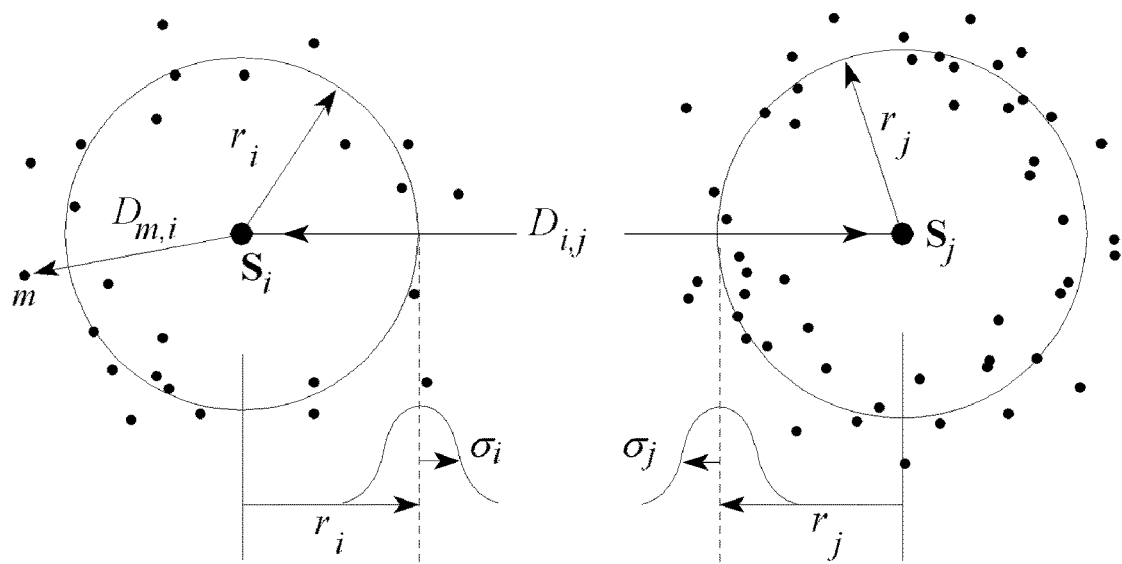
FIG. 2 is a schematic diagram illustrating two clusters.

Referring to FIG. 2, the radius and hypersphere boundary thicknesses are respectively illustrated in $\Re^N$, $r_i$ and $2 \cdot \sigma_i$. The ratio of the boundary thickness on the hypersphere radius tends to 0 when N→∞. This phenomenon is called sphere hardening. Calculated using numerous noise samples, the distance $X_m$–$S_i$ is barely constant. There are no measurements in the hypersphere except near its boundary.

In $\Re^N$, cluster probability densities appear like distributed shells with similar radius and thickness. With the presence of a significant $a_m$ dynamic, the single point signature is replaced by a rod pointing to the axis origin. The corresponding shell is dilated along the axis of the rod. The shell thickness is increased in the rod's direction. Signatures appear like distributed shells with a dissimilar elongation function of the amplitude dynamic. The use of an appropriate metric can partially overcome this shell distortion.

In dynamic clustering, the number of clusters and the cluster centroid location may be adjusted dynamically. The working dimension may be limited by $I_{max}$, the maximum allowable signatures and $I_{min}$, the minimum allowable signatures. A running estimation of the average distance measurement-to-signature may be done during the process of a sequence. The average distance includes the contribution of the noise and the amplitude dynamic. The maximum allowed distance is defined as the average distance r multiplied by a distance coefficient $c_{dist}$. This coefficient may be set at about 1.5. The process may proceed on the basis of comparison and clustering rules as follows:

storing the first $I_{min}$ measurements as new signatures;
for the next measurements, finding the nearest distance measurement-to-the signatures;
if the nearest distance is less than the allowed maximum distance,
then merging the measurement to the nearest signature and re-estimating the average distance r,
else calculating the signature-to-signature distances and finding the nearest signature-to-signature distance;
if the distance is less than the allowed maximum distance,
then merging the two nearest signatures and re-estimating the average distance r,
else putting the measurement as a new signature or, if $I_{max}$ is exceeded, forcing the measurement to merge with the nearest signature;
after the last measurement, the span of time alignment is doubled, for 2→T:
1. calculating the signature-to-signature distances;
2. finding the nearest signature-to-signature distance;
3. if the nearest distance is less than the allowed maximum distance:
4. then, merging the two nearest signatures, calculating the signatures to the new signature distance, inserting the result in the signature-to-signature distance triangle matrix, and going back to step 2;

5. else, stopping.

Sphere-hardening may be used to refine results: measurements distant from the sphere boundary are reprocessed and may be reallocated to another cluster. The threshold may be fixed proportionally to $\sqrt{\sigma_i^2 + \text{var}(\sigma_i)}$ where $\text{var}(\sigma_i)$ is the variance uncertainty on $\sigma_i$ estimation.

Assuming $r_i \sim r_j$, the average distance $\bar{r}$ is recursively estimated from the minimum distance $D_{m,i}$ calculated during the cluster building. This average distance $$\bar{r}_k^2 = \frac{1}{b+1}\left(b \cdot \bar{r}_{k-1}^2 + D_{m,i}^2 \cdot \left(\frac{P_i}{P_i+1}\right)\right), \quad (8)$$
$$\bar{r}_0^2 = 0$$

includes the noise of the measurement and the signature position error. The right factor, a function of the cluster population $P_i$, takes into account the signature position variance. The b coefficient is a weighting factor >1.

The merge process $S_i \cup S_j \rightarrow S_i'$ is $$S_i' = \frac{1}{P_i + P_j}(P_i S_i + P_j S_j) \quad (9)$$

for the new signature calculation where $P_i$ and $P_j$ are the cluster populations. Before the merge, the signatures are time-aligned with respect to the minimum distance. The signature time alignment is also weighted by the cluster population $$S_{i,n-q} \rightarrow S_i \quad q = \text{int}\left(d \cdot \frac{P_j}{P_i + P_j}\right) \quad (10)$$
$$S_{j,n+s} \rightarrow S_j \quad s = d - q$$

where d is the distance (Eq. 5) between the signatures, expressed in number of samples. The order of arrival of the measurements slightly affects the final result, but at the end $$S_i' \cong \frac{1}{P_i}\sum_{k \in \text{cluster } i} X_k = \frac{1}{P_i}\sum_{k \in \text{cluster } i}\{\ldots, X_{k,n-d_k}, \ldots\}. \quad (11)$$

Among various metrics, the minimum of the square distance $$D_{i,j}^2 = \|S_i - S_j\|^2 \cdot \left(1 - \left(\frac{S_i \cdot S_j}{\|S_i\| \cdot \|S_j\|}\right)^2\right) \quad (12)$$

calculated over T tested time alignments may yield the best results. Note that minimizing the right term is like maximizing correlation. Maximizing only the correlation may be ineffectual since many small noise patterns will correlate with some PD signatures. With this metric, the contribution of the PD amplitude variation is reduced by the second term.

Correlation (i.e. Bravais-Pearson coefficient) can be used in the second clustering performed to merge the clusters generated by the different measuring scales. In this second step, the cluster signatures SNR is high and no mistake can occur between a PD cluster signature and a noise signature.

The calculation complexity is $O(N \times T \times M \times I)$ for the distance measurement to signatures and $O(N \times T \times M \times I(I-1)/2)$ for the signature to signature distance triangle matrix. Coefficients $c_{dist}$, $I_{max}$ and $I_{min}$ set a compromise between the calculation time and the wrong merge probability. For numerous measurements, when the number of clusters is stabilized, the calculation of the signature-to-signature distances is no longer needed: the overall calculation complexity tends to $O(N \times T \times M \times I)$.

Accuracy measurements may include some information on cluster dispersion and cluster superimposition. Since the latter information is constant over a data set, the idea is to optimize the process using one or more accuracy estimates that are representative of clustering errors. Proposed estimates are based on two opposite directions. On the one hand, the resolving power, defined as the ratio of the inter-cluster distance over the cluster radius, pertains to the inter-cluster overlapping. On the other hand, the coherency, the ratio of the coherent energy over the total cluster energy, pertains to the cluster itself.

The resolving power $\Re$ is a measure of the cluster-resolving ability. The resolving power $$\Re^2 = \left(\frac{1}{0.5 \cdot I(I-1)}\sum_{i=2}^{I}\sum_{k=1}^{i-1}\|S_k - S_i\|^2\right) \cdot \left(\frac{1}{M}\sum_{i=1}^{I}\sum_{j=1}^{P_i}\|X_{i,j} - S_i\|^2\right)^{-1} \quad (13)$$

corresponds to a signal-to-noise ratio where the RMS cluster inter-distance is the signal and RMS cluster radius is the noise. The equality $0.5 \cdot I(I-1) = \Sigma_{i=2}^{I}\Sigma_{k=1}^{i-1}1$ explains the denominator of the first term and $\Sigma P_i = M$.

The coherency $$\gamma_i^2 = \frac{\left\|\sum_{k \in \text{cluster } i} X_k\right\|^2}{\left(\sum_{k \in \text{cluster}}\|X_k\|\right)^2} = \frac{\sum_{n=1}^{N}\left(\sum_{k \in \text{cluster } i} X_{k,n-d_k}\right)^2}{\left(\sum_{k \in \text{cluster } i}\sqrt{\sum_{n=1}^{N} X_{k,n-d_k}^2}\right)} \quad (14)$$

of the cluster "i" is calculated from the $P_i$ members of this cluster. The mean coherency $$\bar{\gamma}^2 = \Sigma P_i \gamma_i^2 / \Sigma P_i \quad (15)$$

is defined for a sequence considering all the contributing clusters. The following hypothesis may be used: the resolving power and the mean coherency are at their maximum levels for the best solution and decrease with the accumulating errors in the clustering process.

Figure 3:
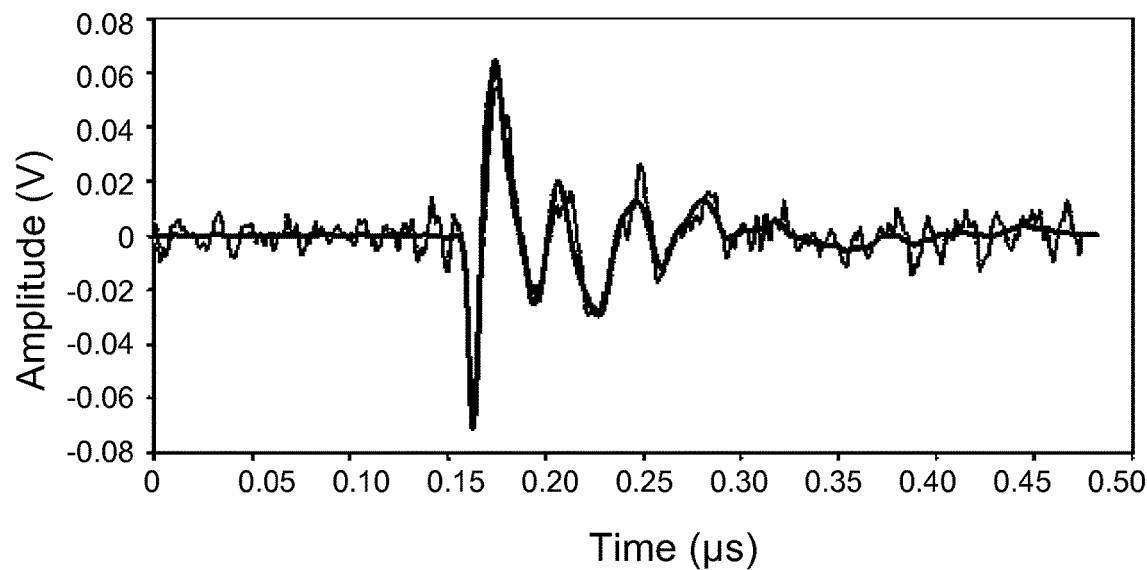
FIG. 3 is a graph illustrating cluster partial discharge signature of measurements (gray line) and one measurement snapshot (thin black line).
Figure 4:
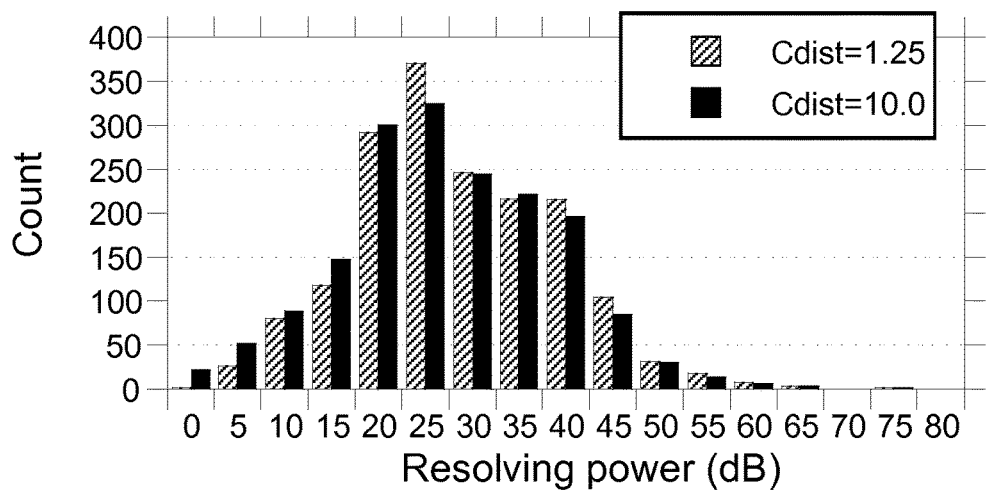
FIG. 4 is a histogram illustrating a resolving power.

FIG. 3 shows a typical PD signature. The results have been obtained for 1 730 sequences (118 932 measurements) taken in an underground distribution network. The first lobe is the sharpest and sets the PD polarity to a negative value here. The range of the resolving power values, 1 to 10 000, calls for logarithm (dB) scaling. The distance coefficient $c_{dist}$ must be set less than the resolving power. To the left of FIG. 4, the 20 counts at 0 dB for $c_{dist}=10$ are explained as clustering errors since $c_{dist}>$resolving power.

Figure 5:
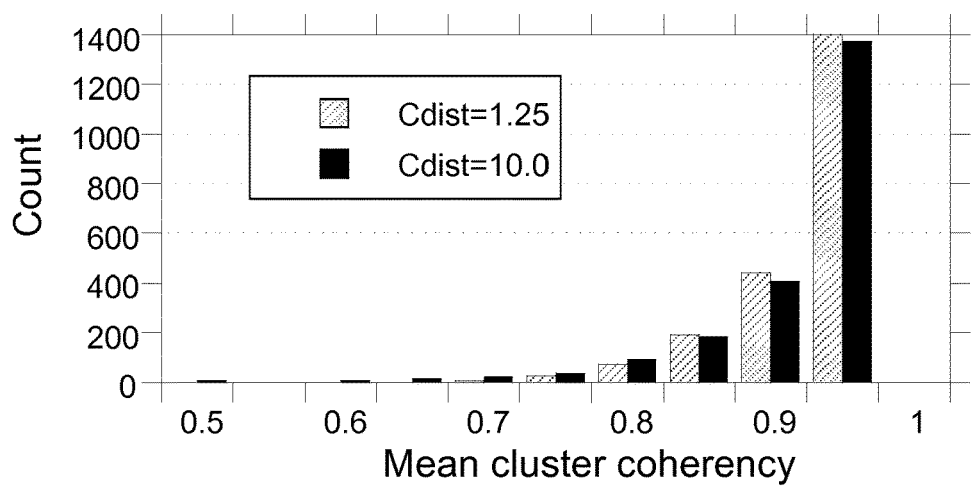
FIG. 5 is a histogram illustrating cluster coherency.
Figure 6:
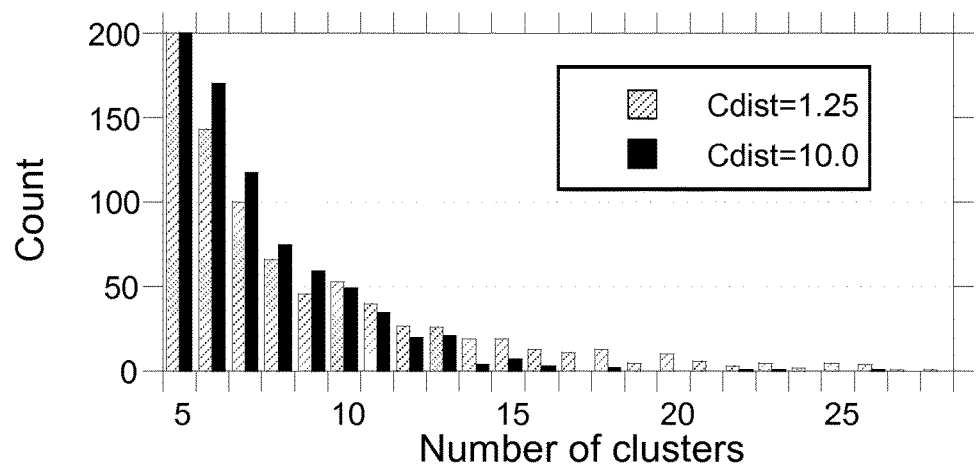
FIG. 6 is a histogram illustrating a number of clusters per sequence.
Figure 7:
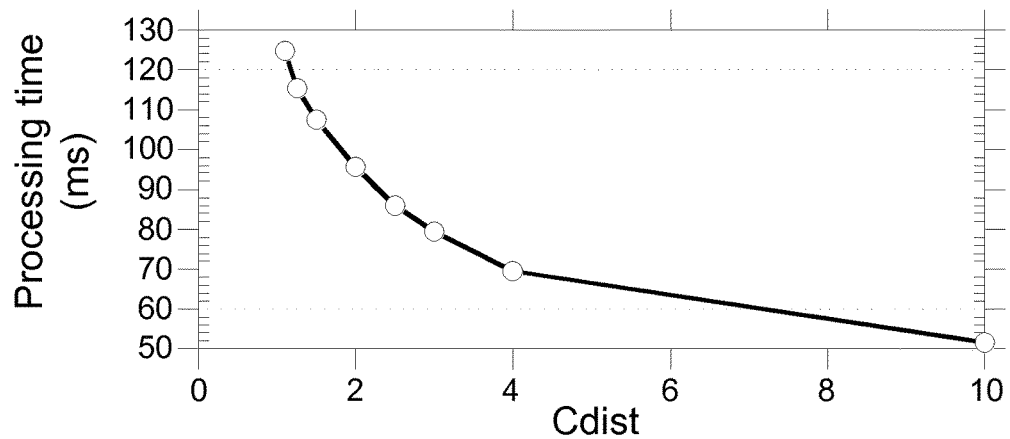
FIG. 7 is a graph illustrating a decrease of the processing time with a $c_{dist}$ parameter.

The cluster coherency is altered mainly for sequences with small resolving power. On FIG. 5, most of the sequences have a large resolving power: shifting the value of $c_{dist}$ to 10 has little effect on coherency. However, the same shift significantly decreases the cluster population of some of the sequences (FIG. 6). FIG. 6 illustrates that the maximum allowable signatures $I_{max}$ can be set at 30. FIG. 7 shows the processing time decreasing with $c_{dist}$. The compromise between the processing time and clustering error probability is set by the data itself and the desired confidence for diagnostic purposes. Based on these latter figures and other results, set $c_{dist}=1.5$ targets more than 99% of the data population and yields a processing time close to the measuring time (~8 s).

Figure 8:
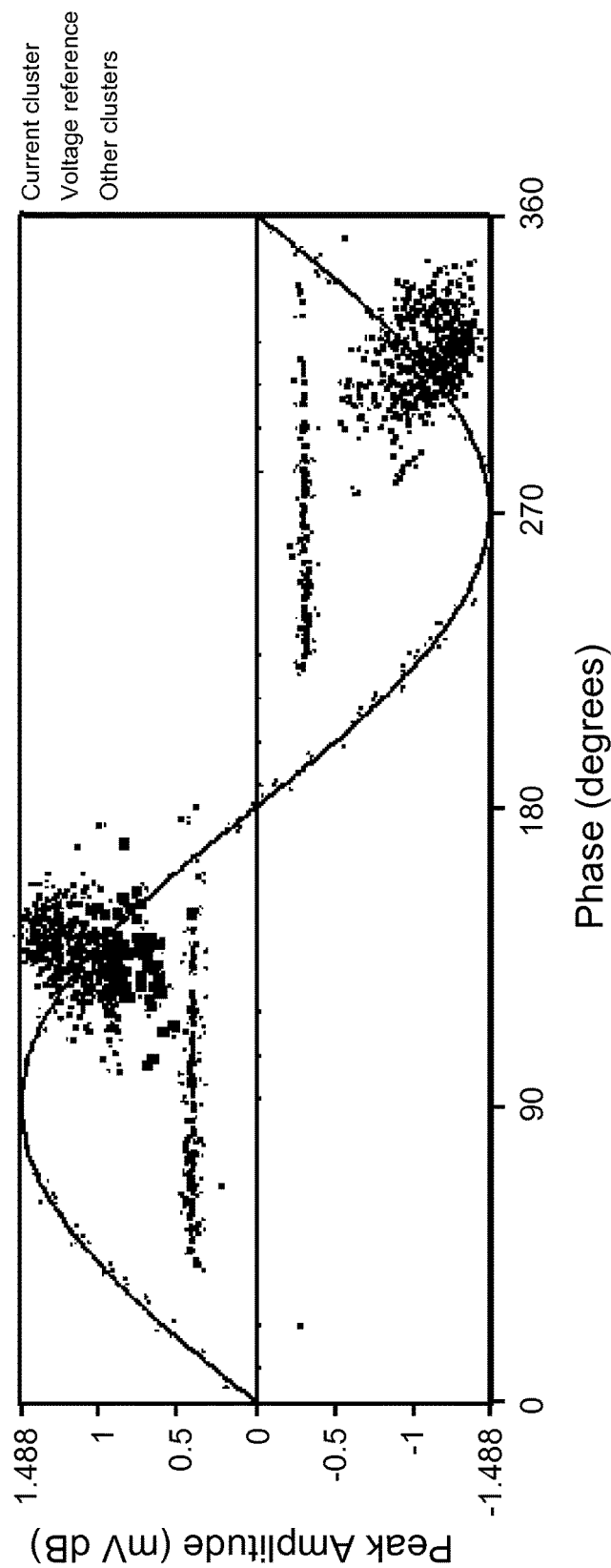
FIG. 8 is a phase-resolved partial discharge diagram of superimposed clusters.

The time domain transient clustering contribution is recognized in the PRPD diagrams with a cluster discrimination. FIG. 8 highlights a cluster of 65 measurements among nine other clusters for a total of 1 182 measurements.

The clustering of transient signals in a time domain as the first step analysis, with further signal processing applied on the cluster signatures, is advantageous at least in those ways: (1) the information is reduced to some signatures instead of numerous measurements; (2) the SNR signature increases with the cluster population; and (3) the post-processing time is reduced. Moreover, the superimposed clusters are discriminated in the PRPD diagram. The explained suboptimal heuristic appears as fast and accurate. Testing using numerous field data may be achieved to tune the parameters and set the choice of metrics in the method according to the invention.

The invention claimed is:

1. A computer-implemented method using a processor for classifying transient signals from an electrical network, said method comprising a first operation of clustering the transient signals, the clustering comprising the steps of:
   capturing the transient signals generated by the electrical network using a measurement system;
   dynamically building up using the processor clusters of similar transient signals in a hyperspace based on comparison and clustering rules stored in memory so that each new one of the transient signals captured ends up in a cluster with similar transient signals formerly captured;
   analyzing using the processor the clusters stored in the memory to determine respective signatures defined by the transient signals gathered in the clusters stored in the memory; and
   processing using the processor the signatures to detect a phenomenon, including at least partial discharges, connectable to an intrinsic attribute of the transient signals, wherein the building up of the clusters comprises merging similar transient signals and similar clusters when a predetermined maximum number of clusters is reached, and computing new parameters of the comparison and clustering rules applicable to the clustering of new transient signals captured, and wherein, to reduce a computational time of the processor to detect the phenomenon, the processor refrains from determining a signature for each of the transient signals and determines one respective signature for each of the dynamically built-up clusters.

2. The method according to claim 1, wherein the building up of the clusters comprises realigning the captured transient signals and carrying out at least one of a transient-to-transient, transient-to-signature, and signature-to-signature distance comparison.

3. The method according to claim 1, wherein the building up of the clusters begins with clusters formed of a number of initial transient captured.

4. The method according to claim 1, wherein the parameters comprise distance calculation metrics.

5. A computer system having a processor and a memory storing executable instructions to be executed by the processor to perform the steps of the method according to claim 1.

6. A non-transitory tangible computer readable storage medium storing executable instructions to be executed by a computer system for performing the steps of the method according to claim 1.

7. The computer-implemented method of claim 1, wherein the comparison and clustering rules use metrics modelling each cluster close to a hypersphere having a radius characteristic of noise in the transient signals gathered in the cluster.

8. A computer system having a processor and a memory storing executable instructions to be executed by the processor to perform the steps of the method according to claim 7.

9. A non-transitory tangible computer readable storage medium storing executable instructions to be executed by a computer system for performing the steps of the method according to claim 7.

10. A computer-implemented method for signal analysis of noisy transient signals observed in time or space, comprising the steps of:
    capturing the noisy transient signals with a measurement system;
    configuring a processor with a memory connected thereto to:
       dynamically build up clusters of similar transient signals in a hyperspace based on comparison and clustering rules stored in the memory so that each new one of the noisy transient signals captured ends up in a cluster stored in the memory with similar noisy transient signals formerly captured at the time of the acquirement, by comparing each new one of the noisy transient signals captured with cluster signatures defined by noisy transient signals formerly captured, the comparison and clustering rules using metrics modelling each cluster close to a hypersphere having a radius characteristic of noise in the noisy transient signals gathered in the cluster; and
       analyze the clusters stored in the memory so that respective signatures defined by the noisy transient signals gathered in the clusters stored in the memory are determined; and
       process the signatures so that a phenomenon connectable to an intrinsic attribute of the noisy transient signals is detected, wherein the building up of the clusters comprises merging similar noisy transient signals and similar clusters when a predetermined maximum number of clusters is reached, and computing new parameters of the comparison and clustering rules applicable to the clustering of new noisy transient signals captured, and wherein, to reduce a computational time of the processor to detect the phenomenon, the processor refrains from determining a signature for each of the transient signals, and determines one respective signature for each dynamically built-up cluster.

11. The method according to claim 10, wherein the building up of the clusters comprises realigning the captured noisy transient signals and carrying out at least one of a transient-to-transient, transient-to-signature, and signature-to-signature distance comparison.

12. The method according to claim 10, wherein the building up of the clusters begins with clusters formed of a number of initial transient signals captured.

13. The method according to claim 10, wherein the parameters comprise distance calculation metrics.

14. A computer system having a processor and a memory storing executable instructions to be executed by the processor to perform the steps of the method according to claim 10.

15. A non-transitory tangible computer readable storage medium storing executable instructions to be executed by a computer system for performing the steps of the method according to claim 10.

* * * * *